Oct. 31, 1933.    H. T. WHEELER    1,932,809
HELICAL ACCORDION PACKING RING
Filed April 19, 1932    2 Sheets-Sheet 1

INVENTOR.
Harley T Wheeler

Oct. 31, 1933.  H. T. WHEELER  1,932,809
HELICAL ACCORDION PACKING RING
Filed April 19, 1932  2 Sheets-Sheet 2
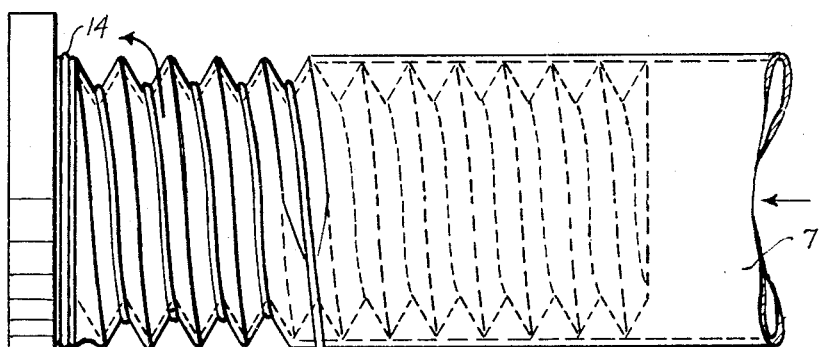
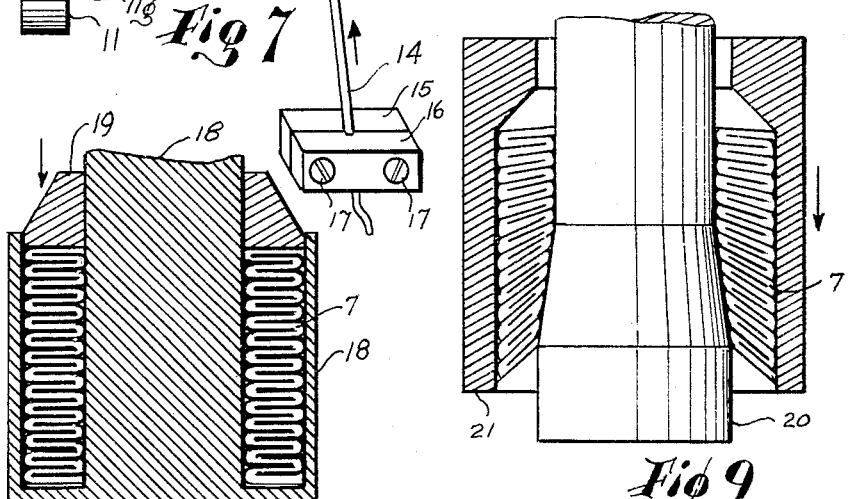
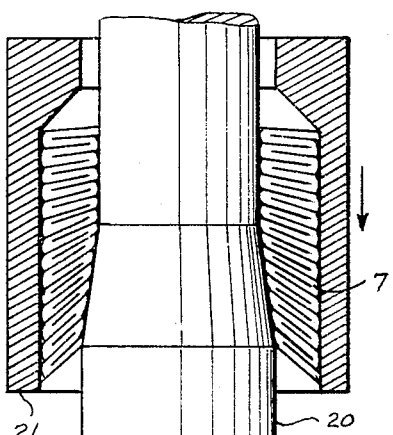
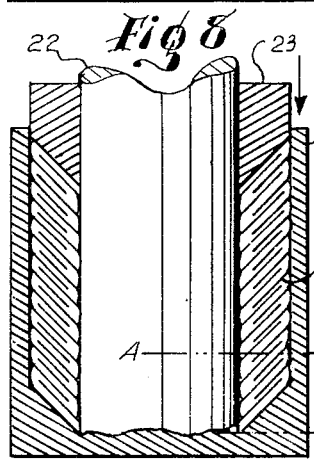
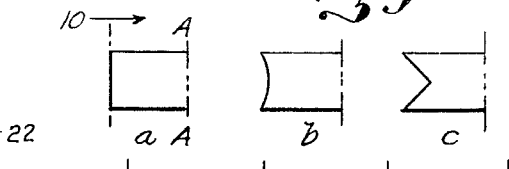
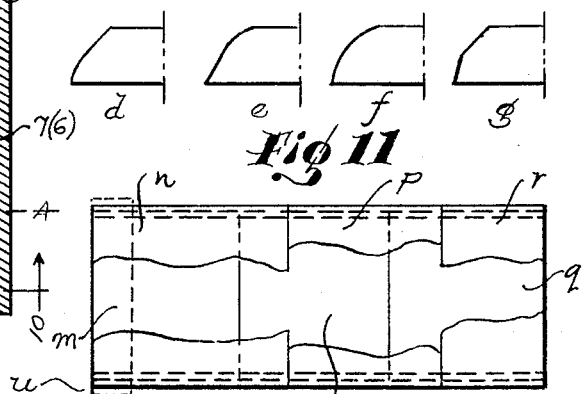
INVENTOR.
Harley T Wheeler Patented Oct. 31, 1933

1,932,809

UNITED STATES PATENT OFFICE 1,932,809

HELICAL ACCORDION PACKING RING

Harley T. Wheeler, Dallas, Tex.

Application April 19, 1932. Serial No. 606,115

10 Claims. (Cl. 288—1)

This invention relates to a process for manufacturing an accordion packing ring and its chief advantage lies in a capability of making a complete set of packing with one piece of material.

Another advantage is that there are no joints or laps between any of the laminations thruout the assembly regardless of the length of the set.

One other advantage is that the process is amenable to making any packing ring shape.

Still another advantage is that a first quality moulded product may be produced very rapidly and at very low cost.

Yet another advantage is that a packing may be made with the greater density at the outer folds.

A similar advantage is that the greater density may be caused at the inner portions.

A related advantage is that a uniform density ring may be produced.

An advantage of considerable practical value is that the accordion construction traps pressure in the folds and is therefore highly elastic.

A still further and important advantage is that the continuous folds are mechanically very strong and build up local saturation which makes the packing practically independent of manual adjustment.

With the foregoing objects and advantages in view, other factors of construction will now be disclosed, accompanied by the drawings, wherein:

Figure 7 shows the method of forming the helical accordion by feeding a section of tubing onto the mandrel.

Figure 8 shows the method of tamping the helical accordion into a radial mass formation.

Figure 9 shows the method of changing the radial accordion into a conical shape.

Figure 10 shows the method of compressing the accordion to a conical ring shape of definite dimensions.

Figure 11 indicates some of the ring shapes which may be produced.

Figure 12 shows a composite tubular section for controlling density, or porosity of porous materials.

In my copending application, Serial Number 600,246, filed March 21, 1932, the theory of phasing and the localizing of saturation was developed and the accordion construction was cited as a qualification of the requirements necessary to overcome compression by pressure elasticity. One of the largest uses of packing is on gate valve stems, the majority of which are non-rising, or rotatable types. The ideal packing for the purpose is a one-piece set, such as is herein described. Another large use is on plunger pumps, as the plunger may be removed for insertion of the one-piece set. There are many other uses for this type of accordion packing.

Figure 1:
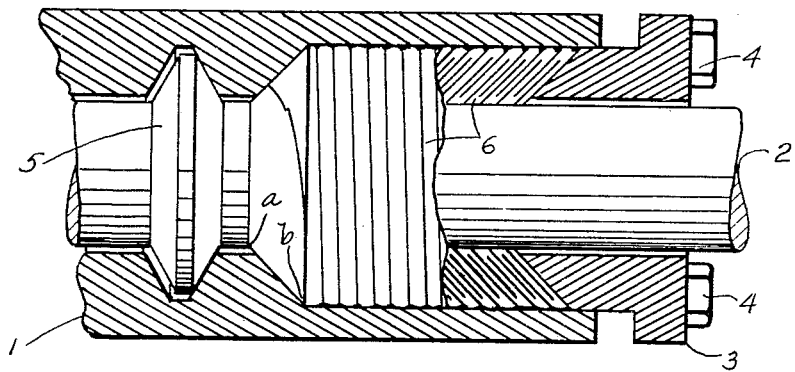
Figure 1 shows the cross-section of a gate valve bonnet showing the use of the packing made according to this invention.

Referring now to Figure 1, the cross-section of the bonnet of a gate valve, the stuffing-box is bored in the housing 1. The valve stem 2 extends thru the housing 1 and has a boss 5 fitting into the housing. The packing gland 3 is held in place by bolts 4, 4, attached to the housing by lugs not shown, and adjusts the one-piece accordion 6 in place to hold pressure in the valve chamber.

The accordion packing 6 is a great improvement on all other types of strip wound rings cemented or vulcanized together, braid packing cut and formed into rings, and for some purposes better than the radial lapped accordion packing disclosed in my application relating to saturation by synthesis, Serial Number 600,246, before mentioned. As pressure penetrates thru the laminations of the packing 6, a small drop of pressure occurs across each lamination causing the conical surfaces to contact with the stem 2. In most packing construction this thrust action would cause contact between the fabric and the rod and result in excessive wear. In the accordion, however, a high saturation is built up around each fold which creates a saturated film of liquid, gas or vapour as the case may be, to exist at the point of contact, thus greatly reducing friction.

Another distinctive advantage of the accordion is that the absence of cements or binders between the laminations permits a slight difference of pressure to cause reaction, the plaits expand both lengthwise and between the wall and the rod surface. Also, inasmuch as the assembly is saturated with the fluid medium under pressure the laminations are retarding agents sensitively changing position with the variation of pressure. The accordion is the tightest form of packing yet devised at either high or low pressure, or during the variation of pressure or in cases of misalignment.

Figure 2:
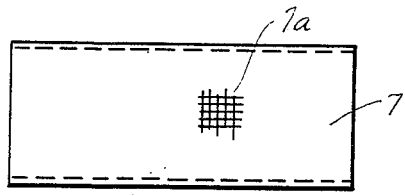
Figure 2 shows a commercial woven tubular section of material for making this accordion.
Figure 3:
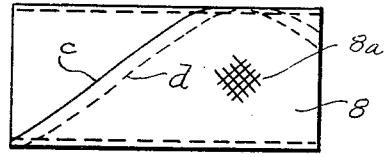
Figure 3 shows a fabricated tubular section of material formed on the bias.
Figure 4:
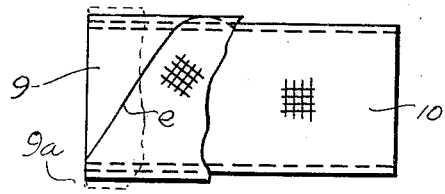
Figure 4 shows a wrap of sheet material superimposed on a tube, making a composite tubular section.

The accordion as herein described necessarily has a tubular base. Figure 2 shows a woven tube of suitable material having a thin wall as indicated by the dotted lines. The warp of this commercial tubing 7 running lengthwise and being crossed at right angles by the woof, a network substantially as shown by 7a causes the density of the accordion to be greatest at the outer portions, as will be elsewhere shown. Figure 3 indicates how a sheet of porous absorbent material 8, cut on the bias as shown by the network at 8a, is wound spirally onto a mandrel and made into a lapped tube, with overlaps as at c and d being held by a suitable cement. The result of a tube so formed on the bias gives a uniform density of the completed accordion, as will be explained. Figure 4 is an example of a composite tube, the inner section 10 being a commercial woven tube similar to that of Figure 2, on which is formed a spiral tube 9 similar to that of Figure 3 with a lap e. A combination is thereby secured having a combination of two networks substantially as shown. As the diameter of the rod is increased requiring deeper accordion grooves, other layers of tubing may be added as shown at 9a.

Figure 5:
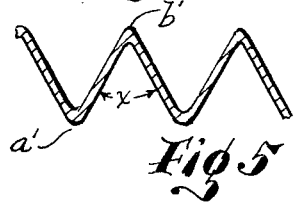
Figure 5 shows an outline of the accordion folds, to be made.

Returning now to Figure 1, the packing set 6 is an assembly of 45 degree conical laminations, the slope length ab being the required length of one leg of the accordion to be formed. In Figure 5 is an outline of this accordion, the length $a'b'$ being made equal to ab of Figure 1. The angle $x$ used for the primary formation is governed by the length $a'b'$ in relation to the diameter of the stem 2, the curvature to which the material will be subjected and its porosity.

Figure 6:
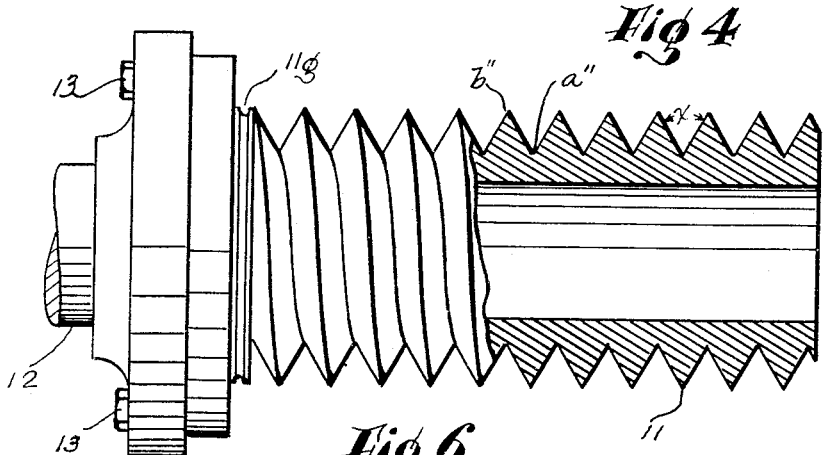
Figure 6 shows a partial cross-section of the mandrel used to form the helical accordion.

A mandrel is used for forming the accordion and an example is shown in Figure 6. A mandrel 11 is attached to a driving head 12 by the screws 13, 13. The surface of the mandrel 11 is formed into a helix similar to a V-thread, the included angle $x$ and the length of the slope $a''b''$ being the same as the values decided upon in Figure 5. A groove 11g is made at the left hand portion of the helix.

The first step in forming my one-piece accordion is shown by Figure 7, the helically formed mandrel 11 being considered in place on a driving head for rotation as shown by the arrow. The woven tube 7, as fabricated according to Figure 2, is pulled over the threaded portion of the mandrel 11 and is fixed to the latter by a wire 14 tightened around the groove 11g provided. Tension in the wire 14 is supplied by passing it thru the clamps 15, 16, the latter held together and adjusted by the screws 17, 17. The mandrel 11 is turned in a direction so that the wire 14 will pull the porous flexible tube 7 into the grooves gradually as the wire is pulled into the groove with the tube. As one end of the wire 14 is fixed to the mandrel 11 at the groove 11g, each groove formed in the tube 7 as it is formed is held in place by the wire 14 and the helical shape is retained after the winding is completed. The operation pulls the warp into the V-shape and increases the density, but the woof is pulled apart in the troughs by the crushing.

After an accordion of sufficient length is obtained the wire 14 is removed and the helical fabrication screwed off the mandrel 11. Turning now to Figure 8, the housing 18 is bored to the size of the stuffing-box of Figure 1, which is approximately the outside diameter of the accordion as it is formed in Figure 7. The annular space between the internal boss of the housing 18 is made equal to distance $a'b'$ of Figure 5, the slope of the grooves. Therefore when the accordion is placed in the housing 18 and tamped with the collar 19 the folds occupy the annular space substantially as shown. No more pressure is applied during this operation than is necessary to bring the folds parallel.

My process of generating special shapes in the accordion must take into account a time lapse for making the transformation. For example, if the form made in Figure 8 is directly transferred to the finishing mould of Figure 10 and pressure applied, the conical laminations will be irregularly formed and the folds will roll unevenly on each other. To avoid the foregoing the accordion 7 on being removed from housing 18 is placed in a housing 21 of the same outside diameter. The mandrel 20 has two diameters, the larger being that of the final or stem diameter and the smaller that of the internal boss of housing 18, Figure 8. A tapered surface joins the two specified diameters. The housing 21, containing the accordion 7 is driven down over the mandrel 20, the tapered section gradually drawing and changing the folds into conical shape, the transformation being completed when the larger diameter passes thru the last lamination.

The accordion 7 is now removed from the housing 21 and inserted in the mould 22, Figure 10, having the bore of the stuffing-box of Figure 1 and the stem being that of the stem 2 of the same figure. The punch 23 is forced against the fabric bringing the laminations to the desired angle and into parallelism and in close contact. It is a property of the accordion when properly pressed into final shape that the folds will roll on each other sufficiently to make an exact fit against the confining walls. The completed packing set 7(6) is now removed from the mould 22 and may be inserted in the stuffing-box of Figure 1.

The conical accordion example as now completed is a 45 degree conical base. It should be obvious that many other shapes may be produced in like manner. Figure 11 shows a series of shapes, each section being that portion of the forming mould 22 of Figure 10, between the section line AA and the arrow (10). A radial accordion, square-ended is shown by a, the cupped formation by b and c is the V-shaped. My special shapes are the concave cone d, the convex-cone e, the concave-convex f and the frusto-cone g. The procedure of forming any of these shapes a to g inclusive is similar to the steps outlined in Figures 9 and 10 after proper allowances are made in the tools necessary for formation.

A further application of the accordion process is shown in Figure 12, the formation of a composite tube of varying densities. Portions m and n are of coarse material, for example o and p of medium texture while r and q are fine spun. The sections are overlapped substantially as shown and cemented together.

Returning now to Figure 7, the accordion formation of tube 7 of the commercial tubing of Figure 2, causes a concentration of the warp due to decreased diameter but a separation of the woof, as before mentioned. The finished ring therefore will be densest at the outer portions and more open at the inner points and contacting surfaces. This designates this accordion as correct construction for a stuffing-box ring as lubrication will be facilitated.

The use of a tube cut on the bias, such as Figure 3, when formed produces a structure practically uniform in density, or porosity, due to the sliding action of the fibers on each other. This type may therefore be used interchangeably for piston rings or stuffing-box types.

A composite structure of Figure 4 produces a well averaged structure and is useful for large diameters.

When the composite structure of Figure 12 is changed into an accordion the porosity is graduated in a lengthwise direction. Two or more sections may be used in forming the tubular assembly as shown by the dotted wrap $u$, and any number of density sections lengthwise as shown.

It should be obvious that the forming of the helical accordion as herein described is a process of wide adaptation. Packing sets and rings for many uses made in various shapes and designs may be produced and such accomplishments as are thus possible are intended to be included under this invention and defined by the appended claims.

I claim:

1. A rod packing for stuffing boxes, composed of a thin tube of absorbent material, said tube having a helical fold formed therein continuously from end to end.

2. A rod packing for stuffing boxes, composed of a thin tube of absorbent material having a fold therein, the adjacent sides of said fold being in contact, the troughs and crests of said fold lying in cylindrical surfaces.

3. A rod packing ring for stuffing boxes, composed of a thin absorbent tube of material with a helically formed fold therein, the sides of said folds being made contiguous and parallel, the troughs and crests of said fold lying in concentric cylindrical surfaces.

4. A rod packing for stuffing boxes, composed of a thin tube of woven material, the warp being parallel to the axis of said tube and the woof at right angles to said warp, said tube being formed with a helical fold therein from end to end, there being a concentration of the warp and a separation of the woof in the troughs, to cause a greater density at the crests of said grooves.

5. A packing for a piston within a cylinder, composed of a thin tube of woven material, the warp and woof of said material being at an angle with the axis of said tube, said tube being formed with a helical fold, having a uniform density on the adjacent sides of said fold, said sides being also contiguous and parallel.

6. A rod packing for stuffing boxes composed of a composite, flexible fabric including two contiguous concentric thin tubes of flexible material, said composite tube formed with a compact helical fold, the adjacent surfaces of said fold being parallel and contiguous.

7. A packing member composed of a composite tube, made up of a plurality of contiguous concentric thin tubes of flexible material formed with a continuous helical compact fold, the adjacent surfaces of said fold being parallel, the inner and outer crests of said fold lying in cylindrical surfaces.

8. A packing member composed of a tube of thin flexible, absorbent material, the walls of which are folded transversely into helical accordion shape, said packing having a truncated cone shaped at one end and a cone-shaped depression at the opposite end.

9. A packing member composed of a tube of thin flexible, absorbent material, a portion of the wall thereof having a helical fold therein.

10. A jointless and lapless packing ring formed from one tube of flexible fabric material and having folded parallel helical laminations therein, the sides of said laminations contacting with each other.

HARLEY T. WHEELER.